(12) United States Patent
Sarikaya et al.

(10) Patent No.: US 9,144,053 B2
(45) Date of Patent: *Sep. 22, 2015

(54) SYSTEM AND APPARATUS FOR LOCAL MOBILITY ANCHOR DISCOVERY BY SERVICE NAME USING DOMAIN NAME SERVICE

(71) Applicant: Futurewei Technologies, Inc., Plano, TX (US)

(72) Inventors: Behcet Sarikaya, Wylie, TX (US); Yangsong Xia, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/898,013

(22) Filed: May 20, 2013

(65) Prior Publication Data

US 2013/0287005 A1    Oct. 31, 2013

Related U.S. Application Data

(63) Continuation of application No. 12/776,129, filed on May 7, 2010, now Pat. No. 8,467,386.

(60) Provisional application No. 61/179,575, filed on May 19, 2009.

(51) Int. Cl.
*H04W 64/00* (2009.01)
*H04L 29/12* (2006.01)
(Continued)

(52) U.S. Cl.
CPC ......... *H04W 64/00* (2013.01); *H04L 29/12066* (2013.01); *H04L 61/1511* (2013.01); *H04W 8/26* (2013.01); *H04W 8/085* (2013.01); *H04W 80/045* (2013.01); *H04W 88/182* (2013.01)

(58) Field of Classification Search
CPC . H04W 80/04; H04W 80/045; H04W 88/182; H04W 60/005; H04W 8/26; H04W 8/082; H04W 8/06; H04W 12/06
See application file for complete search history.

(56) References Cited

U.S. PATENT DOCUMENTS 8,355,695 B2 *   1/2013   Korhonen ..................... 455/410
2003/0225900 A1   12/2003   Morishige et al.
(Continued)

OTHER PUBLICATIONS

Durand, A., et al., "Operational Considerations and Issues with IPv6 DNS," Network Working Group, RFC 4472, Apr. 2006, 30 pages.
(Continued)

*Primary Examiner* — Curtis A Alia
(74) *Attorney, Agent, or Firm* — Conley Rose, P.C.; Grant Rodolph; Brandt D. Howell (57) ABSTRACT

An apparatus comprising a mobile access gateway (MAG) configured to register an Internet Protocol (IP) address for a mobile node (MN) with a local mobility anchor (LMA) to allow proxy mobile IP version 6 (PMIPv6) mobility management for the MN, wherein the MAG communicates a query message that comprises a PMIPv6 service name to a Domain Name Service (DNS) and obtains the IP address of the LMA from the DNS. Also disclosed is a network component comprising at least one processor coupled to a memory and configured to send a DNS query for a plurality of Service Resource Records (SRV RRs), and receive a DNS reply that comprises a plurality of Fully Qualified Domain Names (FQDNs) for a plurality of LMAs, wherein the DNS query comprises a Proxy Mobile Internet Protocol version 6 (PMIPv6) service name, a protocol name, and a domain name.

10 Claims, 3 Drawing Sheets

(51) Int. Cl.
H04W 8/26 (2009.01)
H04W 8/08 (2009.01)
H04W 80/04 (2009.01)
H04W 88/18 (2009.01)

(56) References Cited

U.S. PATENT DOCUMENTS

| | | | |
|---|---|---|---|
| 2007/0268919 | A1 | 11/2007 | Sarikaya et al. |
| 2008/0198807 | A1 | 8/2008 | Xia et al. |
| 2008/0254768 | A1 | 10/2008 | Faccin |
| 2008/0270534 | A1 | 10/2008 | Xia et al. |
| 2009/0003297 | A1 | 1/2009 | Xia et al. |
| 2009/0172785 | A1* | 7/2009 | Chowdhury et al. .............. 726/4 |
| 2010/0054222 | A1* | 3/2010 | Rune ............................. 370/338 |
| 2011/0004932 | A1 | 1/2011 | Spatscheck et al. |

OTHER PUBLICATIONS

Giaretta, G., Ed., et al., "Mobile IPv6 Bootstrapping in Split Scenario," Network Working Group, RFC 5026, Oct. 2007, 29 pages.
Gundavelli, S., Ed., et al., "Proxy Mobile IPv6," Network Working Group, RFC 5213, Aug. 2008, 8 pages.
Soliman, H., Ed., "Mobile IPv6 Support for Dual Stack Hosts and Routers," Network Working Group, RFC 5555, Jun. 2009, 42 pages.
Korhonen, J., Ed., et al., "Diameter Proxy Mobile IPv6: Mobile Access Gateway and Local Mobility Anchor Interaction with Diameter Server," Internet Engineering Task Force (IETF), RFC 5779, Feb. 2010, 21 pages.
Mockapetris, P., "Domain Names-Implementation and Specification," Network Working Group, RFC 1035, Nov. 1987, 56 pages.
Carpenter, B., Ed., "Architectural Principles of the Internet," Network Working Group, RFC 1958, Jun. 1996, 9 pages.
Vixie, P., Ed., et al., "Dynamic Updates in the Domain Name System (DNS Update)," Network Working Group, RFC 2136, Apr. 1997, 27 pages.
Andrews, M., "Negative Caching of DNS Queries (DNS NCACHE)," Network Working Group, RFC 2308, Mar. 1998, 20 pages.
Gulbrandsen, A., et al., "A DNS RR for Specifying the Location of Services (DNS SRV)," Network Working Group, RFC 2782, Feb. 2000, 13 pages.
Droms, R., Ed., et al., "Dynamic Host Configuration Protocol for IPv6 (DHCPv6)," Network Working Group, RFC 3315, Jul. 2003, 102 pages.
Droms, R., "Stateless Dynamic Host Configuration Protocol (DHCP) Service for IPv6," Network Working Group, RFC 3736, Apr. 2004, 10 pages.
Kent, S., "IP Encapsulating Security Payload (ESP)," Network Working Group, RFC 4303, Dec. 2005, 45 pages.
Kaufman, C., Ed., "Internet Key Exchange (IKEv2) Protocol," Network Working Group, RFC 4306, Dec. 2005, 100 pages.
Korhonen, J., et al., "Service Selection for Mobile IPv6," Network Working Group, RFC 5149, Feb. 2008, 10 pages.
Korhonen, J., Ed., et al., "Diameter Mobile IPv6: Support for Network Access Server to Diameter Server Interaction," Network Working Group, RFC 5447, Feb. 2009, 18 pages.
Kaufman, C., et al., "Internet Key Exchange Protocol Version 2 (IKEv2)," Internet Engineering Task Force (IETF), RFC 5996, Sep. 2010, 139 pages.
Perkins, C., Ed., et al., "Mobility Support in IPv6," Internet Engineering Task Force (IETF), RFC 6275, Jul. 2011, 170 pages.
"Digital Cellular Telecommunications System (Phase 2+); Universal Mobile Telecommunications System (UMTS); LTE; Numbering, Addressing and Indentification (3GPP TS 23.003 version 8.4.0 Release 8)," ETSI TS 123 003 V8.4.0, Apr. 2009, 73 pages.
Office Action dated Apr. 16, 2012, U.S. Appl. No. 12/776,129, filed May 5, 2010, 17 pages.
Office Action dated Nov. 8, 2012, U.S. Appl. No. 12/776,129, filed May 5, 2010, 17 pages.
Notice of Allowance dated Feb. 20, 2013, U.S. Appl. No. 12/776,129, filed May 5, 2010, 17 pages.
"3rd Generation Partnership Project; Technical Specification Group Core Network and Terminals; Mobile Radio Interface Layer 3 Specification; Core Network Protocols; Stage 3 (Release 8)," 3GPP TS 24.008 V8.6.0, Jun. 2009, 582 pages.
"IEEE Standard for Local and Metropolitan Area Networks; Port-Based Network Access Control," IEEE Std.802.1X™-2004, Dec. 13, 2004, 179 pages.
"IEEE Standard for Information Technology—Telecommunications and Information Exchange Between Systems—Local and Metropolitan Area Networks—Specific Requirements; Part 3: Carrier Sense Multiple Access with Collision Detection (CSMA/CD) Access Method and Physical Layer Specifications, Section One," IEEE Std. 802.3™-2008, Dec. 26, 2008, 671 pages.
"IEEE Standard for Information Technology—Telecommunications and Information Exchange Between Systems—Local and Metropolitan Area Networks—Specific Requirements; Part 3: Carrier Sense Multiple Access with Collision Detection (CSMA/CD) Access Method and Physical Layer Specifications, Section Two," IEEE Std. 802.3™-2008, Dec. 26, 2008, 790 pages.
"IEEE Standard for Information Technology—Telecommunications and Information Exchange Between Systems—Local and Metropolitan Area Networks—Specific Requirements; Part 3: Carrier Sense Multiple Access with Collision Detection (CSMA/CD) Access Method and Physical Layer Specifications, Section Three," IEEE Std. 802.3™-2008, Dec. 26, 2008, 315 pages.
"IEEE Standard for Information Technology—Telecommunications and Information Exchange Between Systems—Local and Metropolitan Area Networks—Specific Requirements; Part 3: Carrier Sense Multiple Access with Collision Detection (CSMA/CD) Access Method and Physical Layer Specifications, Section Four," IEEE Std. 802.3™-2008, Dec. 26, 2008, 586 pages.
"IEEE Standard for Information Technology—Telecommunications and Information Exchange Between Systems—Local and Metropolitan Area Networks—Specific Requirements; Part 3: Carrier Sense Multiple Access with Collision Detection (CSMA/CD) Access Method and Physical Layer Specifications, Section Five," IEEE Std. 802.3™-2008, Dec. 26, 2008, 615 pages.
"IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications," IEEE Std. 802.11™-2007, Jun. 12, 2007, 1232 pages.
"IEEE Recommended Practice for Local and Metropolitan Area Networks, Coexistence of Fixed Broadband Wireless Access Systems," IEEE Std. 802.16.2™-2004, Mar. 17, 2004, 171 pages.
Giaretta, G., Ed., "Interactions Between PMIPv6 and MIPv6: Scenarios and Related Issues," NETLMM Working Group, Internet Draft, draft-giaretta-netlmm-mip-interactions-02, Nov. 15, 2007, 21 pages.
Kaufman, C., et al., "Internet Key Exchange Protocol: IKEv2," Network Working Group, Internet Draft, draft-ietf-ipsecme-ikev2bis-10, Apr. 14, 2010, 132 pages.
Soliman, H., Ed., "Mobile IPv6 Support for Dual Stack Hosts and Routers," Network Working Group, Internet Draft, draft-ietf-mext-nemo-v4traversal-10.txt, Apr. 7, 2009, 49 pages.
Chowdhury, K., Ed., et al., "MIP6-Bootstrapping for the Integrated Scenario," Network Working Group, Internet Draft, draft-ietf-mip6-bootstrapping-integrated-06.txt, Apr. 20, 2008, 20 pages.
Jang, H., et al., "DHCP Options for Home Information Discovery in MIPv6," MIP6 Working Group, Internet Draft, draft-ietf-mip6-hiopt-17.txt, May 22, 2008, 24 pages.
Yokota, H., et al., "Fast Handovers for Proxy Mobile IPv6," Network Working Group, Internet Draft, draft-ietf-mipshop-pfmipv6-04.txt, May 1, 2009, 34 pages.
Yokota, H., et al., "Fast Handovers for Proxy Mobile IPv6," Network Working Group, Internet Draft, draft-ietf-mipshop-pfmipv6-14.txt, May 14, 2010, 42 pages.
Korhonen, J., et al., "LMA Discovery for Proxy Mobile IPv6," Network-Based Localized Mobility Management (NetLMM), Internet Draft, draft-ietf-netlmm-lma-discovery-03.txt, Feb. 24, 2010, 11 pages.

(56) References Cited

OTHER PUBLICATIONS

Giaretta, G., Ed., "Interactions Between PMIPv6 and MIPv6: Scenarios and Related Issues," NETLMM Working Group, Internet Draft, draft-ietf-netlmm-mip-interactions-03, May 1, 2009, 21 pages.

Giaretta, G., Ed., "Interactions Between PMIPv6 and MIPv6: Scenarios and Related Issues," NETLMM Working Group, Internet Draft, draft-ietf-netlmm-mip-interactions-06, May 3, 2010, 20 pages.

Wakikawa, R., et al., "IPv4 Support for Proxy Mobile IPv6," NETLMM Working Group, Internet Draft, draft-ietf-netlmm-pmip6-ipv4-support-12.txt, Apr. 23, 2009, 51 pages.

Wakikawa, R., et al., "IPv4 Support for Proxy Mobile IPv6," NETLMM Working Group, Internet Draft, draft-ietf-netlmm-pmip6-ipv4-support-13.txt, Jun. 30, 2009, 51 pages.

Wakikawa, R., et al., "IPv4 Support for Proxy Mobile IPv6," NETLMM Working Group, Internet Draft, draft-ietf-netlmm-pmip6-ipv4-support-18.txt, Feb. 12, 2010, 54 pages.

Korhonen, J., Ed., et al., "Diameter Proxy Mobile IPv6: Support for Mobility Access Gateway and Local Mobility Anchor to Diameter Server Interaction," Diameter Maintenance and Extensions (DIME), Internet Draft, draft-korhonen-dime-pmip6-02.txt, Nov. 19, 2007, 25 pages.

Korhonen, J., Ed., et al., "Diameter Proxy Mobile IPv6: Support for Mobility Access Gateway and Local Mobility Anchor to Diameter Server Interaction," Diameter Maintenance and Extensions (DIME), Internet Draft, draft-korhonen-dime-pmip6-04.txt, Sep. 15, 2008, 23 pages.

Korhonen, J., et al., "LMA Discovery for Proxy Mobile IPv6," Network-Based Mobility Management (NetLMM), Internet Draft, draft-korhonen-netlmm-lma-discovery-01.txt, Feb. 24, 2009, 10 pages.

Sarikaya, B., et al., "Local Mobile Anchor Discovery Using DNS by Service Name," Network Working Group, Internet Draft, draft-sarikaya-netlmm-lma-dnsdiscdsmip-00, May 12, 2009, 11 pages.

Sarikaya, B., et al., "Local Mobile Anchor Discovery Using DNS by Service Name," Network Working Group, Internet Draft, draft-sarikaya-netlmm-lma-dnsdiscovery-01, Jul. 13, 2009, 11 pages.

Sarikaya, B., et al., "Local Mobile Anchor Discovery Using DNS by Service Name," Network Working Group, Internet Draft, draft-sarikaya-netlmm-lma-dnsdiscovery-02, May 4, 2010, 11 pages.

Sarikaya, B., et al., "Local Mobile Anchor Discovery Using DNS by Service Name," Network Working Group, Internet Draft, draft-sarikaya-netlmm-lma-dnsdiscovery-03, May 4, 2010, 11 pages.

Xia, F., et al., "RADIUS Support for Proxy Mobile IPv6," Network Working Group, Internet Draft, draft-xia-netext-radius-00, Jan. 7, 2010, 34 pages.

Xia, F., et al., "RADIUS Support for Proxy Mobile IPv6," Network Working Group, Internet Draft, draft-xia-netlmm-radius-04, Apr. 7, 2009, 36 pages.

"Universal Mobile Telecommunications System (UMTS); LTE; Access to the Evolved Packet Core (EPC) via Non-3GPP Access Networks; Stage 3 (3GPP TS 24.302 Version 8.5.0 Release 8)," ETSI TS 124 302 V8.5.0 Apr. 2010, 54 pages.

Bradner, S., "Key Words for Use in RFCs to Indicate Requirement Levels," Network Working Group, RFC 2119, Mar. 1997, 3 pages.

Johnson, D., et al., "Mobility Support in IPv6," Network Working Group, RFC 3775, Jun. 2004, 155 pages.

Aboba, B., et al., "The Network Access Identifier," Network Working Group, RFC 4282, Dec. 2005, 17 pages.

* cited by examiner

SYSTEM AND APPARATUS FOR LOCAL MOBILITY ANCHOR DISCOVERY BY SERVICE NAME USING DOMAIN NAME SERVICE

CROSS-REFERENCE TO RELATED APPLICATIONS

This application is a continuation of U.S. patent application Ser. No. 12/776,129 filed May 7, 2010 by Behcet Sarikaya et al. and entitled "System and Apparatus for Local Mobility Anchor Discovery By Service Name Using Domain Name Service", which claims priority to U.S. Provisional Patent Application No. 61/179,575 filed May 19, 2009 by Behcet Sarikaya et al. and entitled "System and Method for Local Mobility Anchor (LMA) Discovery in a Wireless Communications System," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standard, Wireless Fidelity (WiFi) based on the IEEE 802.11 standard, and Worldwide Interoperability for Microwave Access (WiMAX) based on the IEEE 802.16 standard. Mobile IPv6 (MIPv6) is a protocol that allows a mobile node (MN), such as a mobile device, to handle its mobility management. As such, the MN may communicate, e.g. via an access router (AR), with a MIPv6 home agent (HA) for the MN. Proxy Mobile IPv6 (PMIPv6) is a protocol that allows a MN to avoid handling its own mobility management. In PMIPv6, the mobility management of the MN can be handled by a mobile access gateway (MAG) that communicates with a PMIPv6 Local Mobility Anchor (LMA) on behalf of the MN in the network. In some access networks, the LMA can act as a MIPv6 HA for some of the MNs and as a PMIPv6 LMA for other MNs to handle the mobility management of the MNs in the network.

SUMMARY

In one embodiment, the disclosure includes an apparatus comprising a MAG configured to register an IP address for a MN with a LMA to allow PMIPv6 mobility management for the MN, wherein the MAG communicates a query message that comprises a PMIPv6 service name to a Domain Name Service (DNS) and obtains the IP address of the LMA from the DNS.

In another embodiment, the disclosure includes a network component comprising at least one processor coupled to a memory and configured to send a DNS query for a plurality of Service Resource Records (SRV RRs), and receive a DNS reply that comprises a plurality of Fully Qualified Domain Names (FQDNs) for a plurality of LMAs, wherein the DNS query comprises a PMIPv6 service name, a protocol name, and a domain name.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In MIPv6, the MN may need an IP address for the HA before handling its mobility management. In some cases, the MN may be pre-configured with an IP address for the HA prior to initiating the MIPv6 mobility management session. Alternatively, the MN may use a dynamic discovery procedure to obtain the IP address of the HA, e.g. before starting the MIPv6 session. However, a similar mechanism does not exist for PMIPv6.

Disclosed herein is a system and method for enabling the dynamic discovery of the LMA in PMIPv6. Specifically, a MAG or a Network Access Server (NAS) may use a DNS to request and obtain an IP address for the LMA that will serve this MN as its mobility anchor. The MAG may act as a DNS client that exchanges a DNS request/reply for SRV RRs with a DNS server to obtain a FQDN of a LMA. The MAG may also obtain an IP address of the LMA in the DNS reply or using a subsequent DNS query/reply exchange. The MAG may then register the IP address of the MN with the LMA to establish the PMIPv6 mobility management session. Similarly, the MAG may obtain a plurality of IP addresses for a plurality of LMAs and cache the addresses locally. Thus, the MAG may register other MNs with any of the cached IP addresses for the LMAs to establish the PMIPv6 mobility management sessions for the MNs, e.g. without using subsequent DNS request/reply sequences.

Figure 1:
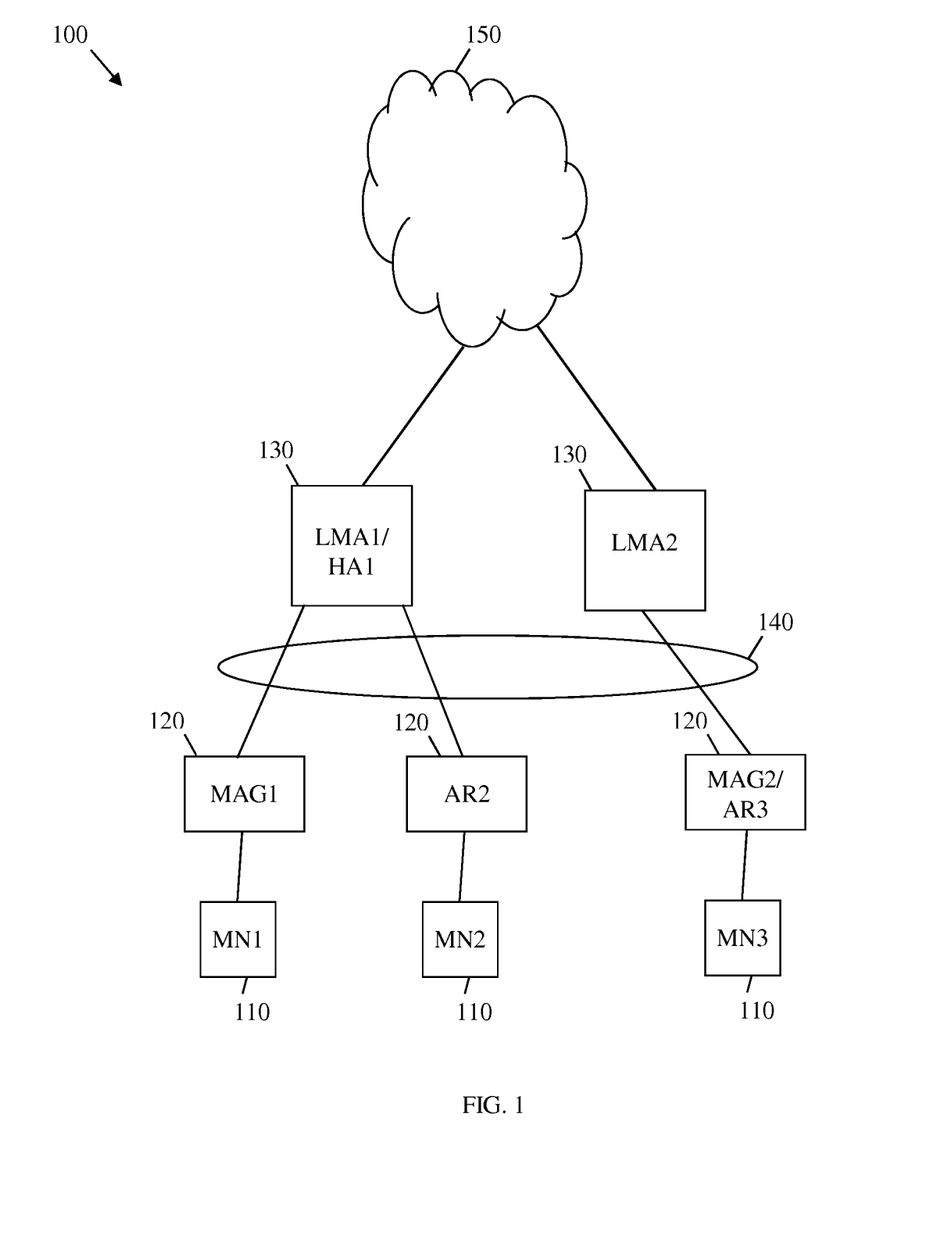
FIG. 1 is a schematic diagram of one embodiment of a wireless access network system.

FIG. 1 illustrates an embodiment of a wireless access network system 100, which may support MIPv6 and PMIPv6 protocols for handling the mobility management of a plurality of mobile devices. The wireless access network system 100 may comprise a plurality of MNs 110, a plurality of NASs 120 (e.g. MAGs and ARs) that may be coupled to the MNs 110, and a plurality of LMAs 130 that may be coupled to the NASs 120. Additionally, the wireless access network system 100 may comprise at least one wireless access network 140 that may couple the LMAs 130 to the NASs 120 and at least one service provider network 150 that may be coupled to the LMAs 130. The wireless network 140 may communicate with the service provider network 150 via the LMA 130. For example, the wireless access network 140 may be a third Generation Partnership Project (3GPP) network or an IEEE 802.11 Wireless Local Area Network (WLAN), also referred to as WiFi network.

In an embodiment, the MNs 110 may be located in the wireless network 140, e.g. within the coverage range of the wireless network 140, and access the wireless network 140 via the NASs 120. Thus, the MNs 110 may communicate with the service provider network 150, e.g. via the LMAs 130. The components of the wireless access network system 100 may support the MIPv6 protocol, the PMIPv6 protocol, or both. The PMIPv6 protocol is described in Internet Engineering Task Force (IETF) Request for Comments (RFC) 5213, which is incorporated herein by reference. As such, the wireless access network system 100 may support a plurality of scenarios that may require interaction between PMIPv6 and MIPv6, e.g. as described in IETF document draft-ietf-netlmm-mip-interactions-06, which is incorporated herein by reference as if reproduced in its entirety. It will be appreciated that FIG. 1 illustrates one embodiment of the wireless access network system 100. In another embodiment, the MN 110 may be located in any of a plurality of different wireless networks, which may support MIPv6 and/or PMIPv6 protocols.

In an embodiment, the MNs 110 may be any mobile devices that use the NASs 120 and/or the LMAs 130 to access the server provider network 150 or other network(s). Specifically, the MNs 110 may comprise mobile user-oriented devices that communicate with the service provider network 150, e.g. via the access wireless network 140. For example, the MNs 110 may comprise cellular telephones, notebook computers, personal digital assistants (PDAs), any other wireless devices, or combinations thereof. Additionally or alternatively, the MNs 110 may comprise fixed communications devices, such as desktop computers or set top boxes, which may be connected to the NASs 120 and/or the LMAs 130 using wireless technology.

In an embodiment, the NASs 120 may be any devices or components that are configured to provide the MNs 110 access to the service provider network 150, e.g. via the LMAs 130. The NASs 120 may be located in the wireless access network 140 or a plurality of wireless access networks 140 that communicate with the service provider network 150. The NASs 120 may comprise a MAG (e.g. MAG1) that is configured to handle mobility management for a first MN 110 (e.g. MN1) based on the PMIPv6 protocol. Mobility management may comprise binding traffic flows, such as IPv6 traffic flows, to any wireless access network where the MNs 110 may establish an active interface. The flows may correspond to services provided to the MNs 110 by the service provider network 150 and/or other external networks. Additionally, the NASs 120 may comprise an AR (e.g. AR2) that is configured to handle mobility management for a second MN 110 (e.g. MN2) based on the MIPv6 protocol. Further, the NASs 120 may comprise a combination of MAG and AR (e.g. MAG2/AR3) that is configured to handle mobility management for a third MN 110 (e.g. MN3) based on MIPv6 protocol and/or PMIPv6.

In an embodiment, the LMAs 130 may be any devices or components that provide connectivity and/or external access to the MNs 110 via the wireless network(s) 140. The LMAs 130 may comprise a MIPv6 HA (e.g. HA1) that is configured to support the MIPv6 protocol to enable mobility for the MNs 110. Additionally, the LMAs 130 may comprise a PMIPv6 LMA (e.g. LMA1 or LMA2) that is configured to support the PMIPv6 protocol to enable mobility for the MNs 110. The MIPv6 HA and the PMIPv6 LMA may be combined in one LMA 130 or may be separate LMAs 130. The LMA 130 may also forward one or more flows to the MNs 110 via any of the NASs 120 that may have an active interface with the MNs 110.

The service provider network(s) 150 may be any network that provides services to the MNs 110 via the wireless access network(s) 140. For instance, the service provider network 150 may be an Internet Service Provider (ISP), a network service provider (NSP), an application service provider (ASP), or combinations thereof. The services may be provided to the MNs 110 in the form of upstream and/or downstream IP packets, such as IPv6 packets, and may comprise data, text, voice, video, and/or any other services. The packets may be part of an IPv6 flow that may be identified by a source IP address, a destination IP addresses, a transport protocol number, a source port number, a destination port number, or combinations thereof. The services may be directed between the service provider network(s) 150 and the wireless access network(s) 140 using the LMAs 130.

In an embodiment, an operator domain may provide services to the components of the wireless access network system 100 including PMIPv6 protocol services. For instance, the operator domain may provide a DNS server that may allow the MAGs in the NASs 120 to query, e.g. on behalf of the MNs 110, the domain names for the PMIPv6 LMAs and in response obtain the FQDNs and/or IP addresses of the PMIPv6 LMAs. The MAGs may need to obtain the IP addresses of the PMIPv6 LMAs to handle the mobility management for the MNs 110 on behalf of the MNs 110. Accordingly, the PMIPv6 LMAs may use SRV RRs to publish their domain names in a DNS database. The SRV RRs may enable servers such as the LMAs 130 to publish their services in the DNS database in the form of records, where some of the servers may be designated as primary servers and other servers may be designated as backup servers. The SRV RRs may be described in RFC 2782, which is incorporated herein by reference.

Figure 2:
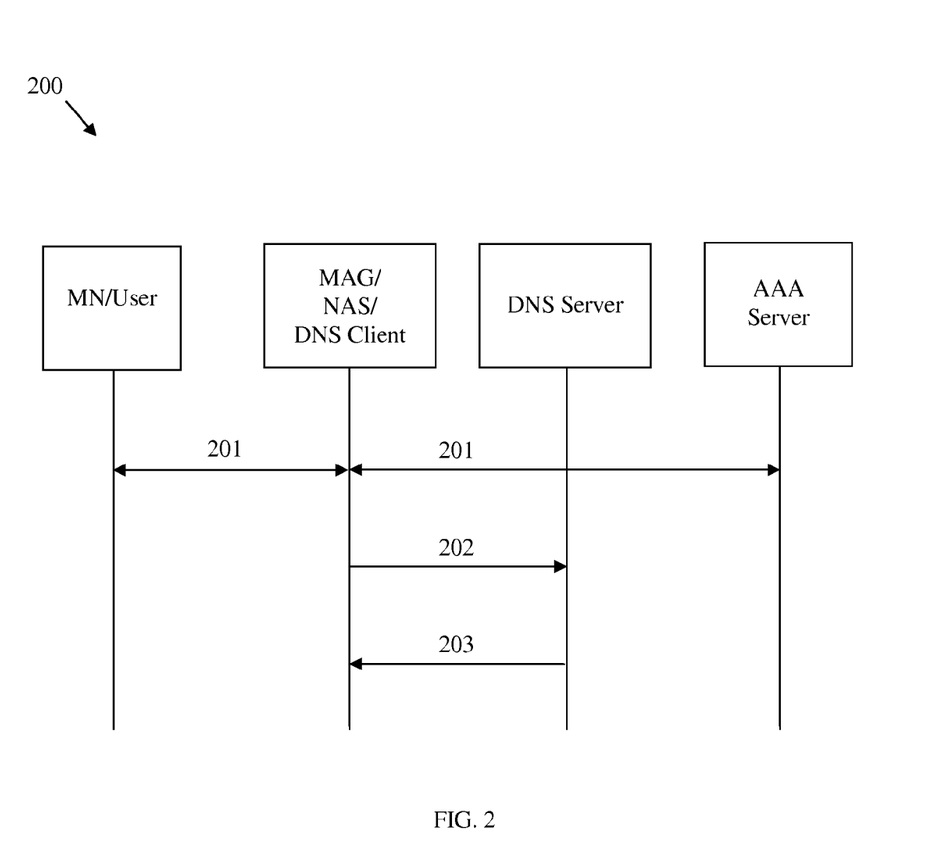
FIG. 2 is a protocol diagram of an embodiment of a LMA discovery method.

FIG. 2 illustrates an embodiment of a LMA discovery method 200, which may be used to obtain or discover the FQDN and IP address of a PMIPv6 LMA. The LMA discovery method 200 may be used by a MAG or NAS to obtain the FQDN, and hence the IP address, of a PMIPv6 LMA, e.g. as published in the SRV RRs of the DNS database. For example, a MAG in the NASs 120 may use the LMA discovery method 200 to discover the IP address of a PMIPv6 LMA in the LMAs 130 on behalf of a MN in the MNs 110. The LMA discovery method 200 may allow the MAG to discover the IP address of the PMIPv6 LMA in a dynamic manner before handling the mobility management of the MN. At step 201, the MN or user may initiate a network access authentication procedure with the MAG or NAS. For example, the MN/user may communicate with the MAG/NAS using an IEEE 802.1X procedure or an Internet Key Exchange (IKE) or IKE version 2 (IKEv2) secure association (SA) followed by an extensible authentication protocol (EAP) authentication sequence. The MAG/NAS may then communicate with an authentication, authorization, or accounting (AAA) server to authenticate the MN/user. To authorize the MN/user, the AAA server may verify whether the MN/user is allowed to use the PMIPv6 service, e.g. for mobility management purposes.

In an embodiment, upon authenticating the MN/user, the AAA server may assign an address for an LMA and return this information to the MAG/NAS using a DIAMETER protocol or a Remote Authentication Dial In User Service (RADIUS) protocol. As such, the MAG/NAS may obtain the LMA address to begin a mobility management session for the MN/user and the LMA discovery method 200 may end. The DIAMETER protocol support for PMIPv6 is described in IETF document RFC 5779 and the RADIUS protocol support for PMIPv6 is described in IETF document draft-xia-netext-radius-00, which are both incorporated herein by reference. Alternatively, the AAA server may return a FQDN for the LMA to the MAG/NAS, e.g. after authenticating the MN/user. Thus, the MAG/NAS may query a DNS infrastructure to resolve the FQDN and obtain the IP address of the LMA, e.g. as described in IETF document draft-ietf-netlmm-lma-discovery-03, which is incorporated herein by reference. The LMA discovery method 200 may then end.

In another embodiment, the MAG/NAS may act as a DNS client and implement steps 202 and 203 to obtain the FQDN and the IP address for a LMA. At step 202, the MAG/NAS may send a DNS query to a DNS server to retrieve SRV RRs for PMIPv6 services that use IPv6 protocol. The DNS query may comprise a SRV RR format that specifies a domain for the LMAs. At step 203, the MAG/NAS may receive a DNS reply from the DNS server that corresponds to a plurality of stored SRV RRs. The DNS reply may comprise information about a plurality of LMAs, such as the FQDNs or IP addresses for the PMIPv6 LMAs. The MAG/NAS may then select one of the PMIPv6 LMAs to handle mobility management for the MN/user and register the MN/user with the IP address of the LMA, e.g. as described in RFC 5213.

In an embodiment, the MAG/NAS may use in the DNS query a SRV RR format such as:

_Service._Proto.Name TTL Class SRV Priority Weight Port Target, where _Service indicates the service name, _Proto indicates the protocol name, Name specifies the domain for the LMAs, TTL indicates the time interval that the resource record may be cached before the source of the information should again be consulted, Class indicates the class of the DNS query, SRV indicates a SRV type DNS query, Priority indicates the priority of the query, Weight indicates the weight of the query, Port indicates the port on this target host of this service, and Target indicates the domain name of the target host MN. The MAG may use the service name "pmip6" and the protocol name "ipv6", which may indicate a pmip6 service (e.g. for mobility management) that uses the IPv6 protocol. Alternatively, the MAG may use the service name "pmip6" and the protocol name "ipv4", which may indicate that the pmip6 service uses the IP version 4 (IPv4) protocol. The SRV RR may have a DNS type code equal to 33. The MAG may specify the name for the domain in the SRV RR format that corresponds to the MN/user. The domain name may be obtained or extracted from a MN identifier, e.g. as described in RFC 5213. For instance, the MN identifier may be a network access identifier (NAI) according to RFC 4282, which is incorporated herein by reference. If the NAI is not available, the MAG may use its own domain name. For example, the MAG may use a DNS query that comprises a query name (QNAME) equal to _pmip6._ipv6.operator.com, a query class (QCLASS) equal to IN, and a query type (QTYPE) equal to SRV.

In an embodiment, the MAG may receive in the DNS reply from the DNS server a plurality of FQDNs for a plurality of LMAs that match the DNS query, e.g. as specified in the SRV RR format. Thus, the MAG may resolve the received FQDNs using a separate DNS query to obtain the corresponding IP addresses of the LMAs. However, using an extra query to resolve the FQDNs may require a second DNS query/reply sequence. Instead, the DNS server may be configured to return the IP addresses of the LMAs in response to a first DNS query from the MAG. Upon receiving the IP addresses of the LMAs, the MAG may cache the IP addresses and subsequently register other nodes with the cached IP addresses without initiating additional DNS queries. For instance, if the network policy indicates that the MNs in the same domain may be served by the same LMA, the MAG may register a plurality of MNs in the same domain with the cached IP address of the LMA associated with that domain.

The MAG may then receive from the DNS server a DNS reply that comprises a plurality of FQDNs for a plurality of LMAs that may be configured for PMIPv6 service, e.g. using IPv6 or IPv4 protocol. The MAG may then select in a random manner one of the FQDNs to resolve and hence obtain the IP address of the corresponding LMA. In an embodiment, the MAG may randomly select the FQDN based on the value of the MN identifier that was used in the DNS query. For instance, the MAG may use the value of the MN identifier modulus the number of returned FQDNs in the DNS reply to select the FQDN. Such a selection scheme may improve the random selection of the FQDN, and therefore improve the load balancing of the mobility management assignments over the LMAs, e.g. in the same domain.

For example, the MAG may use in the DNS request a MN identifier equal to 123456789, and hence receive from the DNS server a DNS reply that comprises the following list of FQDNs:

lma-chicago.operator.com
lma-ecoast.operator.com
lma-dfw.operator.com
lma-newyork.operator.com
lma-sanfrancisco.operator.com
lma-wcoast.operator.com The MAG may then select one of the FQDNs that corresponds to one of the LMAs by calculating the MN identifier value modulus the number of returned FQDNs, e.g. 123456789 mod 6, which may be equal to about three. Accordingly, the MAG may select the third FQDN in the list, e.g. lma-dfw.operator.com, and obtain the corresponding IP address, e.g. using a subsequent DNS query, to register the corresponding LMA with the MN.

The LMAs that support PMIPv6 may have IPv6 addresses and/or IPv4 LMA addresses (IPv4-LMAAs) as described in IETF document draft-ietf-netlmm-pmip6-ipv4-support-18, which is incorporated herein by reference. The MAG may need to discover the IPv4-LMAAs to handle mobility management for IPv4 MNs. The MAG may also need to discover an IPv4-LMAA if the transport between the MAG and the LMA, e.g. the link or wireless access network, uses the IPv4 protocol. As such, the MAG may use a service name that specifies the PMIPv6 and the IPv4 protocol in the DNS query for IPv4-LMAAs. For example, the MAG may use the service name QNAME "_pmip6._ipv4.operator.com" for the SRV RRs in the DNS query to receive an IPv4 address for a LMA that serves IPv4 hosts or if the transport network is an IPv4 network.

Upon receiving a DNS query for IPv4-LMAAs, the DNS server may send a DNS reply for the SRV RRs that comprise the PMIPv6 service and IPv4 protocol names. If the DNS reply comprises the IPv4-LMAAs, the MAG may select one of the IPv4-LMAAs to register with the MN. However, if the MAG receives a plurality of FQDNs without IP addresses in the DNS reply, the MAG may send a second DNS query to retrieve the IPv4 address for one of the FQDNs, e.g. from an AAA server. In another embodiment, the DNS server may send a DNS reply for SRV RRs for PMIPv6 service that comprises a plurality of dual-stack FQDNs. The dual-stack FQDNs may correspond to a plurality of PMIPv6 LMAs that support both IPv6 and IPv4 hosts. In some embodiments, the DNS server may also add the IPv4-LMMAs and/or IPv6 addresses that correspond to the dual-stack FQDNs in the DNS reply.

The servers referenced in SRV RRs, such as the PMIPv6 LMAs, may be subject to denial of service attacks, e.g. by the MNs that receive access to the servers. The denial of service attacks may present a security threat to the network and may be addressed as required by RFC 2782. For instance, in the LMA service name discovery method described above, the SRV RRs may be used by the trusted MAGs that were previously authorized within the same PMIPv6 domain. Thus, granting access to the MNs via the trusted MAGs may not substantially increase the denial of service attacks on the PMIPv6 servers or LMAs.

Figure 3:
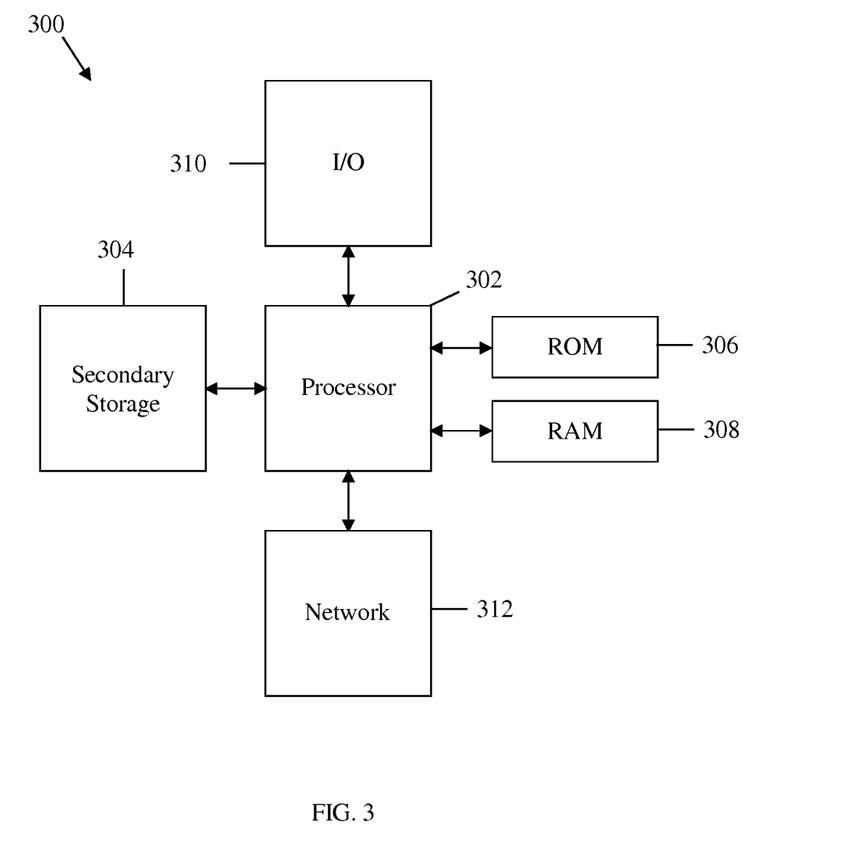
FIG. 3 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 3 illustrates a typical, general-purpose network component 300 suitable for implementing one or more embodiments of the components disclosed herein. The network component 300 includes a processor 302 (which may be referred to as a central processor unit or CPU) that is in communication with memory devices including secondary storage 304, read only memory (ROM) 306, random access memory (RAM) 308, input/output (I/O) devices 310, and network connectivity devices 312. The processor 302 may be implemented as one or more CPU chips, or may be part of one or more application specific integrated circuits (ASICs).

The secondary storage 304 is typically comprised of one or more disk drives or tape drives and is used for non-volatile storage of data and as an over-flow data storage device if RAM 308 is not large enough to hold all working data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage 304. The RAM 308 is used to store volatile data and perhaps to store instructions. Access to both ROM 306 and RAM 308 is typically faster than to secondary storage 304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a Mobile Access Gateway (MAG), the method comprising:
   requesting authentication of a Mobile Node (MN) for network access to a Proxy Mobile Internet Protocol version Six (PMIPv6) domain;
   requesting authorization of the MN for mobility service; and
   after authenticating the MN for network access and authorizing the MN for mobility service, dynamically discovering, by the MAG, a Local Mobility Anchor (LMA) on behalf of the MN, wherein dynamically discovering the LMA comprises:
      receiving, from an Authentication, Authorization, and Accounting (AAA) server, a LMA Fully Qualified Domain Name (FQDN) that is a generic name for the PMIPv6 domain;
      querying a Domain Name Service (DNS) server in order to resolve the FQDN to a plurality of LMA Internet Protocol (IP) addresses associated with a plurality of LMAs in the PMIPv6 domain; and
      selecting one of the plurality of resolved LMAs to provide the mobility service for the MN.

2. The method of claim 1, wherein the LMA FQDN is received as part of a AAA message that ends a successful authentication and authorization portion of an AAA exchange.

3. A computer program product for use by a Mobile Access Gateway (MAG) configured to dynamically discover at least one local mobility anchor (LMA) on behalf of a Proxy Mobile Internet Protocol (PMIP) Mobile Node (MN), the computer program product comprising computer executable instructions stored on a non-transitory computer readable medium such that when executed by a processor cause the MAG to:
  send a Domain Name Service (DNS) query for a plurality of Service Resource Records (SRV RRs); and
  receive a DNS reply that comprises at least one Fully Qualified Domain Name (FQDNs) for at least one LMA, an Internet Protocol (IP) address for at the least one LMA, or both,
  wherein the DNS query comprises a PMIP service name, a protocol name, and a domain name, and
  wherein the DNS query comprises a SRV RR format: _Service._Proto.Name TTL Class SRV Priority Weight Port Target, where _Service is set to "pmip6" to indicate a PMIP version six (PMIPv6) service name.

4. The computer program product of claim 3, wherein the instructions when executed by a processor further cause the MAG to:
  send a second DNS query to obtain a plurality of IP addresses that correspond to the FQDNs; and
  receive a second DNS reply that comprises the IP addresses.

5. The computer program product of claim 3, wherein the instructions when executed by a processor further cause the MAG to:
  obtain a plurality of IP addresses for LMAs that correspond to the FQDNs;
  cache the IP addresses; and
  register the MN with an LMA having one of the cached IP addresses to allow PMIP mobility management of the MN without sending a second DNS query.

6. The computer program product of claim 3, wherein _Proto is set to "ipv6" to indicate an IP version 6 (IPv6) protocol.

7. A computer program product for use by a Mobile Access Gateway (MAG) configured to dynamically discover at least one local mobility anchor (LMA) on behalf of a Proxy Mobile Internet Protocol (PMIP) Mobile Node (MN), the computer program product comprising computer executable instructions stored on a non-transitory computer readable medium such that when executed by a processor cause the MAG to:
  send a Domain Name Service (DNS) query for a plurality of Service Resource Records (SRV RRs); and
  receive a DNS reply that comprises at least one Fully Qualified Domain Name (FQDNs) for at least one LMA, an Internet Protocol (IP) address for at the least one LMA, or both,
  wherein the DNS query comprises a PMIP service name, a protocol name, and a domain name, and
  wherein the DNS query comprises a SRV RR format: _Service._Proto.Name TTL Class SRV Priority Weight Port Target, where _Service is set to "pmip4" to indicate a PMIP version four (PMIPv4) service name.

8. The computer program product of claim 7, wherein _Proto is set to "ipv4" to indicate an IP version 4 (IPv4) protocol.

9. A computer program product for use by a Mobile Access Gateway (MAG) configured to dynamically discover at least one local mobility anchor (LMA) on behalf of a Proxy Mobile Internet Protocol (PMIP) Mobile Node (MN), the computer program product comprising computer executable instructions stored on a non-transitory computer readable medium such that when executed by a processor cause the MAG to:
  obtain a domain name for the MN from a network access identifier (NAI) for the MN;
  send a Domain Name Service (DNS) query for a plurality of Service Resource Records (SRV RRs), wherein the DNS query comprises a PMIP service name, a protocol name, and the domain name:
  receive a DNS reply that comprises a plurality of Fully Qualified Domain Name (FQDNs) for a plurality of LMAs;
  select at least one of the FQDNs to obtain an Internet Protocol (IP) address for at least one the LMAs, wherein selecting the at least one of the FQDNs comprises randomly selecting one of the FQDNs provided in the DNS reply by calculating a value of N modulus a quantity of the FQDNs; and
  register the IP address with the MN to allow PMIP mobility management.

10. The computer program product of claim 9, wherein the MAG and the MN are located in a wireless access network that communicates with the LMA, and wherein the DNS query comprises an IP version four (IPv4) protocol indicator that indicates that the wireless access network uses IPv4 or an IP version six (IPv6) protocol indicator that indicates that the wireless access network uses IPv6.

\* \* \* \* \*